United States Patent
Tiemann

(10) Patent No.: US 7,299,617 B2
(45) Date of Patent: Nov. 27, 2007

(54) COMBUSTION CHAMBER INTERMEDIATE PART FOR A GAS TURBINE

(75) Inventor: Peter Tiemann, deceased, late of Witten (DE); by Iris Oltmanns, legal representatives, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 722 days.

(21) Appl. No.: 10/487,519

(22) PCT Filed: Aug. 28, 2002

(86) PCT No.: PCT/EP02/09615

§ 371 (c)(1),
(2), (4) Date: Feb. 18, 2004

(87) PCT Pub. No.: WO03/021084

PCT Pub. Date: Mar. 13, 2003

(65) Prior Publication Data

US 2005/0091987 A1 May 5, 2005

(30) Foreign Application Priority Data

Sep. 3, 2001 (EP) .................................. 01121088

(51) Int. Cl.
*F02C 3/14* (2006.01)
(52) U.S. Cl. ........................................ 60/39.37; 60/752
(58) Field of Classification Search .............. 60/39.37, 60/722, 751, 752, 760
See application file for complete search history.

(56) References Cited

U.S. PATENT DOCUMENTS

| 2,567,079 | A | * | 9/1951 | Owner et al. | 60/39.37 |
| 2,592,060 | A | * | 4/1952 | Oulianoff | 60/39.37 |
| 3,169,367 | A | * | 2/1965 | Hussey | 60/39.37 |
| 4,195,474 | A | | 4/1980 | Bintz et al. | |
| 4,264,272 | A | | 4/1981 | Weiler | |
| 4,719,748 | A | * | 1/1988 | Davis et al. | 60/39.37 |
| 5,414,999 | A | | 5/1995 | Barnes | |
| 5,447,413 | A | | 9/1995 | Maier et al. | |

* cited by examiner

*Primary Examiner*—L. J. Casaregola

(57) ABSTRACT

This invention relates to a gas turbine having a combustion chamber arrangement and a turbine chamber connected downstream of said combustion chamber arrangement, wherein the combustion chamber arrangement includes a plurality of individual combustion chambers formed by input areas and transition areas converging in an annular gap leading to the turbine chamber and wherein the longitudinal axes of the individual combustion chambers are placed at an angle relative to an engine axis that is defined by the axial extension of the turbine chamber. In order to improve said gas turbine by visibly reducing the thermal and mechanical loads of the individual combustion chambers in the transition area so that cooling requirements can be lowered in said area, the transition area of at least one individual combustion chamber into the turbine chamber is deflected in the direction of the engine axis and substantially in the input area of the turbine chamber.

15 Claims, 1 Drawing Sheet

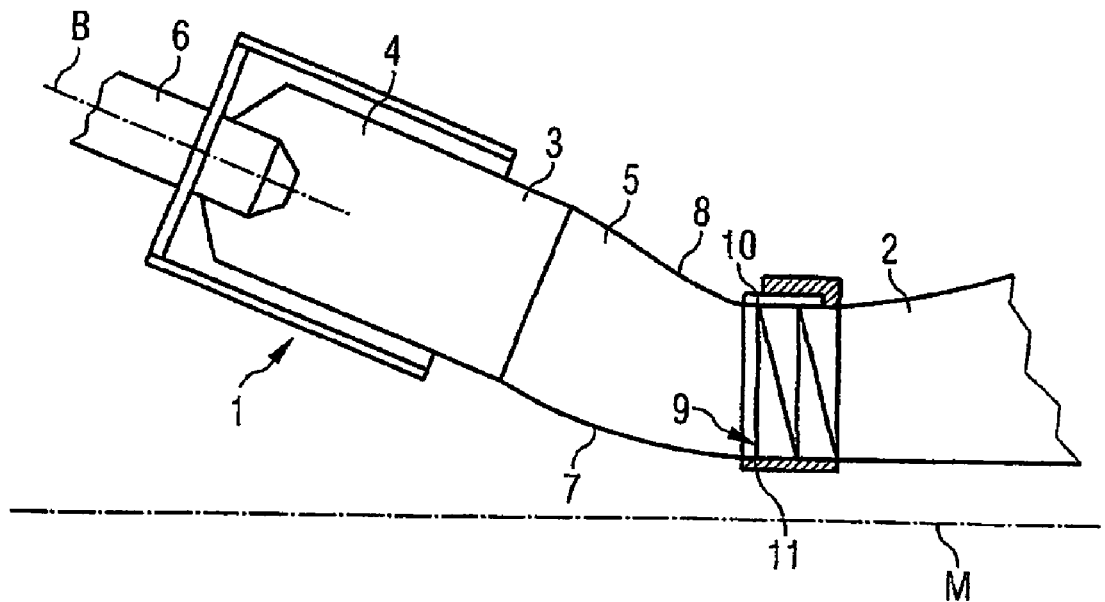
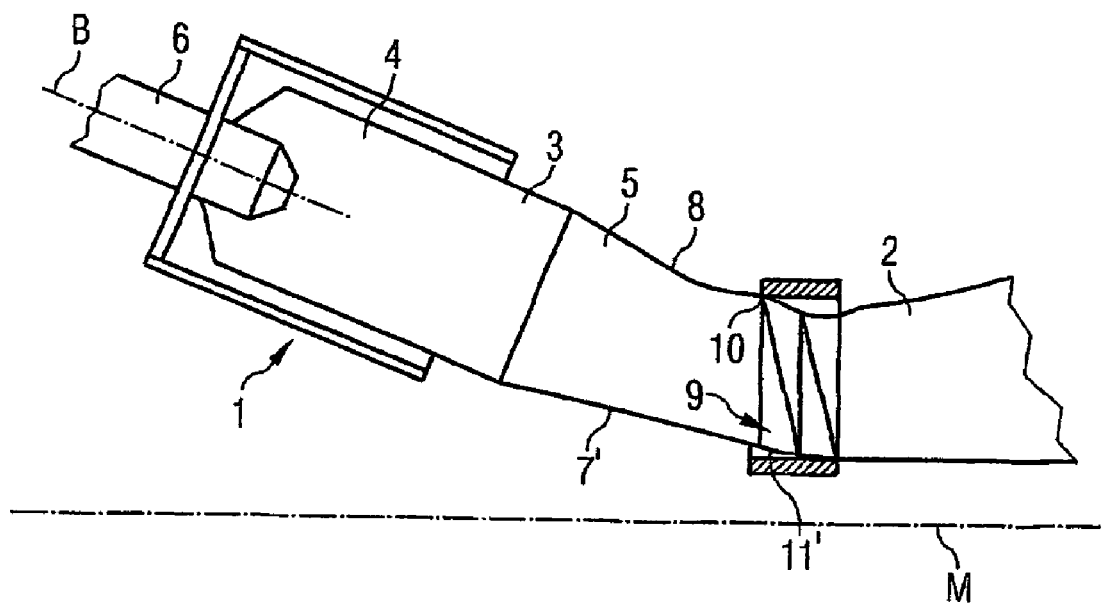

COMBUSTION CHAMBER INTERMEDIATE PART FOR A GAS TURBINE

CROSS REFERENCE TO RELATED APPLICATIONS

This application is the U.S. National Stage of International Application No. PCT/EP02/09615, filed Aug. 28, 2002 and claims the benefit thereof. The International Application claims the benefits of European application No. 01121088.7 EP filed Sep. 3, 2001, both of the applications are incorporated by reference herein in their entirety.

FIELD OF INVENTION

The invention relates to a gas turbine with a combustion chamber arrangement and a turbine chamber connected downstream of this combustion chamber arrangement, wherein the combustion chamber arrangement includes a plurality of individual combustion chambers formed by input sections and transition sections converging in an annular gap leading to the turbine chamber and wherein the longitudinal axes of the individual combustion chambers are placed at an angle relative to an engine axis that is defined by the axial alignment of the turbine chamber.

BACKGROUND OF INVENTION

Such gas turbines are known from prior art. With a burner located upstream of the individual combustion chambers of the combustion chamber arrangement, a mixture of fuel and oxygenated combustion gas is ignited and burns in the individual combustion chambers of the combustion chamber arrangement. The hot gases produced by the combustion of the mixture of combustion gas and fuel expand and are accelerated in the direction of the turbine chamber downstream of the combustion chamber arrangement. The individual combustion chambers are formed from an input section of generally cylindrical form and a transition section in which the hot gas flow with a circular cross-section changes to a hot gas flow with a annular segment shaped cross-section, so that at the end of the plurality of individual combustion chambers a hot gas flow with an overall annular cross-section is formed. This enters the turbine chamber where it meets an arrangement of fixed blades and moving blades, and causes the latter to move. With this principle, rotation of a turbine shaft connected to the moving blades is achieved, which can be used for various purposes such as power generation or jet propulsion.

For design reasons the individual combustion chambers of the combustion chamber arrangement are placed at an angle relative to an engine axis that is defined by the axial alignment of the turbine chamber. Because of this angle the hot gas flows, which initially run along the axis of the individual combustion chamber, are deflected in the direction of the engine axis.

Such an arrangement of an individual combustion chamber with a transition to the turbine chamber of a gas turbine has been published in U.S. Pat. No. 4,719,748. In the arrangement presented there, the hot gas flow generated in a cylindrical input section of the individual combustion chambers are deflected via a transition section in the direction of a turbine chamber, whereby the annular input gap leading to the turbine chamber is essentially aligned coaxially with the engine axis. Deflection of the hot gas flow from the axis of the individual combustion chamber at an angle to the engine axis towards a direction parallel to the engine axis takes place in this arrangement in the transition section of the individual combustion chambers. For this purpose the internal walls in the direction of the turbine shaft and the external walls of the transition sections away from the turbine shaft are embodied with appropriate baffles which force the hot gas flow from the direction of flow parallel to the combustion chamber axis to a direction of flow parallel to the engine axis. One problem with this procedure is that in the area of the baffles embodied with comparatively small radii the hot gas flow hits the walls of the individual combustion chambers in the input area, exposing them to increased mechanical and thermal loads. This leads to a steep temperature rise in the individual combustion chambers in the transition section, which in turn calls for increased cooling. In the above-mentioned U.S. Pat. No. 4,719,748 this is taken into account by baffle cooling in the area of the transition section, which necessitates a pressure drop. The pressure drops required to cool such an embodied transition section of the individual combustion chambers and the quantities of additional cooling gas required reduce the overall efficiency of the turbine and are therefore seen as disadvantageous. In addition, the cooling arrangement shown in U.S. Pat. No. 4,719,748 for the individual combustion chambers calls for higher design costs as the chambers have to be provided with a double-shell casing along their entire length.

SUMMARY OF INVENTION

On the basis of this prior art, the object of the invention is to create a gas turbine in which the thermal and mechanical loads of the individual combustion chambers are significantly reduced in the transition section so that cooling requirements can be lowered in this area.

In order to achieve this object it is proposed with the present invention that the transition section of at least one individual combustion chamber and a corresponding input area of the turbine chamber be embodied in such a way that the gas flow running from at least one individual combustion chamber into the turbine chamber is deflected in the direction of the engine axis substantially in the input area of the turbine chamber.

Because deflection of the hot gas flow in the direction of the engine axis due to the embodiment of the transition section of the individual combustion chamber and the input area of the turbine chamber in accordance with the present invention no longer takes place almost entirely in the transition section of the individual combustion chamber but is substantially relocated to the input area of the turbine chamber, the turbine elements located in the input area of the turbine chamber, in particular the fixed blades, are exposed to the mechanical and thermal loads associated with the deflection. These elements, which are embodied as cast elements to withstand the thermal stresses already present, can dissipate the additional thermal loads resulting from the deflection of the gas flow much better however than the reshaped transition sections of the combustion chambers. Thanks to the essentially linear hot gas flow in the area of the transition section, these are relieved of thermal loads to such an extent that cooling requirements in this area can be significantly reduced. Compared with prior art, material stresses on the individual combustion chamber in the transition section are therefore reduced, which has a positive effect overall on the durability and service life of this component. The fact that there is no longer any need to expend a great deal of time, money and effort on cooling the transition section of the individual combustion chamber means that the chamber is easier to design and that designers have much greater freedom.

In a beneficial embodiment of the invention, the transition section of at least one individual combustion chamber has an internal wall located closer to a turbine shaft and an external wall located further away from the turbine shaft, whereby the internal and external walls of the individual combustion chamber are essentially straight or curve gently in the direction of the engine axis. A gentle curve in the direction of the engine axis means a curve with a large radius, with the hot gas flow being deflected in a wide arc, so that thermal load peaks can be avoided in these areas. With the internal and externals walls of the transition section running essentially in a straight line there are no additional thermal or mechanical loads due to the deflection of the gas flow.

In a possible embodiment of the invention the external wall of the transition section of the individual combustion chamber runs essentially in a straight line, whereas the internal wall is gently curved, in other words it has a large radius.

In accordance with a further beneficial feature of the invention, fixed blades are arranged in the turbine chamber with fixed blade platforms aligned essentially parallel to the engine axis, with at least one fixed blade platform in the input area of the turbine chamber running at an angle in the direction of the combustion chamber longitudinal axis. In this way, the fixed blade platforms running at an angle or in a curve deflect the hot gas flow and absorb the additional thermal and mechanical loads resulting from deflection. Since the fixed blades are castings, as mentioned above, and as such have excellent thermal conductivity, additional thermal loads arising at this point because of the deflection of the hot gas flow can be easily dissipated and absorbed with comparatively simple cooling measures.

In accordance with a further beneficial embodiment of the invention, the fixed blade platforms in the input area can be lengthened in the direction of the individual combustion chambers to further relieve the load on the transition section of the individual combustion chamber. In this way the hot gas flow can hit the lengthened sections of the fixed blade platforms very early and be deflected in the direction of the engine axis by these elements. With such a fixed blade platform in the input area of the turbine chamber, lengthened in the direction of the individual combustion chamber the radius in which deflection of the hot gas flow takes place can also be increased and the thermal and mechanical loads arising from deflection can be distributed over a larger area.

In a further embodiment of the gas turbine in accordance with the invention, fixed blade platforms are provided in the turbine chamber in the form of internal and external fixed blade platforms, with the internal fixed blade platforms arranged close to the turbine shaft and the external platforms further away. To deflect the hot gas flow at least one internal and/or at least one external fixed blade platform can be angled to the engine axis and/or extended.

The thermal and mechanical loads on the individual combustion chamber in the transition section are further reduced if, in accordance with a further beneficial embodiment of the invention, the cross-sectional area of the individual combustion chamber is essentially constant in the direction of the gas flow. By avoiding reductions in the cross-sectional area in the direction of the hot gas flow, the additional thermal and mechanical loads on the individual combustion chamber walls in the area of the transition section resulting from narrowing of the cross-section are further reduced.

For a gas turbine, all the individual combustion chambers and corresponding input areas are preferably embodied with one or more of the features described above.

BRIEF DESCRIPTION OF THE DRAWINGS

Further features and advantages of the invention will emerge from the description which follows of embodiments, based on the enclosed figures. The figures are as follows:

FIG. 1 is a sectional drawing showing the transition between an individual combustion chamber and the turbine chamber in a first embodiment of a gas turbine in accordance with the invention and FIG. 2 is a sectional drawing corresponding to the section from FIG. 1 showing the transition between an individual combustion chamber and the turbine chamber in a second embodiment of a gas turbine in accordance with the invention.

The same parts are shown with the same reference numbers in the two figures.

DETAILED DESCRIPTION OF INVENTION

FIG. 1 shows a section of a turbine 1 in accordance with the invention in a first embodiment. In particular it shows an individual combustion chamber 3 in the transition to a turbine chamber 2 of the gas turbine 1. The individual combustion chamber 3 comprises an input section 4 and a transition section 5. The input section 4 is cylindrical with a circular base area; the transition section 5 changes the circular cross-section of the input section 4 in a cross-section with the form of a section of an annular segment. In the gas turbine 1 as per the invention there are a plurality of such individual combustion chambers 3 which on the output side of the transition sections 5 define an annular gap which leads to the turbine chamber 2.

Upstream of the individual combustion chamber 3 is a burner 6 which ignites a mixture of an oxygenated combustion gas and a fuel. Actual combustion then takes place in the individual combustion chambers 3 of the gas turbine 1, with resultant hot gases propagating along the individual combustion chamber through the input sections 4 and the transition sections 5 in the direction of the turbine chamber 2. The individual combustion chamber 3 essentially extends in the axial direction along a combustion chamber axis B which is at an angle to an engine axis M aligned in the longitudinal direction of the turbine chamber 2.

Because of this angled arrangement of the individual combustion chambers 3 with respect to the engine axis M it is necessary to deflect the hot gas flow arising in the individual combustion chambers 3 and propagating in the direction of the turbine chamber 2 so that it hits the fixed blades and moving blades arranged in the turbine chamber 2 parallel to the engine axis M. In the present arrangement, this deflection essentially takes place in an input area 9 at the entrance to the turbine chamber. An external wall 8, located away from the turbine shaft, of the transition section 5 of the individual combustion chamber 3 essentially runs in a straight line and does not provide a contact surface for the hot gas flow. In this upper area, the hot gas flow is deflected by an external fixed blade platform 10 angled in the direction of individual combustion chambers 3. The internal wall 7, which is located close to the turbine shaft, runs in the embodiment shown in a gentle curve, in other words with a large radius. Along this curve there is an initial gentle deflection of the hot gas flow, which is completed in the input area 9 to the turbine chamber 2. In the shown embodiment of the system comprising the transition section 5 of the individual combustion chamber 3 and the input area 9 of the turbine chambers 2, in which substantial deflection of the hot gas flow takes place in the input area 9 of the turbine chamber 2, the thermal loads produced by the deflection of the hot gas flow occur for the most part in the input area 9 of the turbine chamber 2. They are absorbed there in particular by the fixed blade platforms 10 and 11 which as castings have excellent thermal conductivity and can therefore be cooled down from this additional thermal load without additional cooling outlay. The formed individual combustion chambers 3 and in particular the transition sections 5 are relieved of thermal loading, which leads to a significant reduction in cooling requirements in this area and therefore to a simpler design and reduced costs for this component.

The further embodiment of the invention shown in FIG. 2 differs from the embodiment shown in FIG. 1 in the design of the internal wall 7' of the transition section 5 of the individual combustion chamber 3 and in the design of the internal fixed blade platform 11' in the input area 9 of the turbine chamber 2. In this embodiment, in addition to the external fixed blade platform 10 the internal fixed blade platform 11' is also curved in the direction of the combustion chamber 3, the internal wall 7' is correspondingly flatter. As a result, an additional proportion of the necessary deflection of the hot gas flow is moved from the transition section 5 of the individual combustion chamber 3 to the input area 9 of the turbine chambers 2 and therefore to a part of the gas turbine 1 that can withstand a greater thermal load. This leads to further relief for the individual combustion chambers 3 with the benefits described above.

In both embodiments shown the external fixed blade platform 10 or the internal fixed blade platforms 11 and 11' may be extended in the direction of the individual combustion chambers 3 to provide better thermal relief for the individual combustion chambers 3 in the critical area of hot gas flow deflection.

The invention provides for a gas turbine in which deflection of the hot gas flow is moved in the direction of the turbine chambers 2 to relieve the transition sections 5 of the individual combustion chambers 3, which leads to significantly reduced cooling requirements in this area. As castings, the fixed blade platforms bearing the thermal loads in this invention are much easier to cool than the shaped combustion chambers, with that overall costs for cooling are reduced.

The invention claimed is:

1. A combustion chamber arrangement in a gas turbine comprising:
    a combustion chamber comprising an upstream cylindrical input section and a downstream transition section, the transition section changing from a circular cross-section of the input section to a cross-section with an annular segment form at its downstream end and comprising an internal wall portion and an external wall portion; and
    a turbine chamber comprising an input area comprising an internal fixed blade platform and an external fixed blade platform;
    wherein the combustion chamber is disposed along a combustion chamber axis different from an engine axis, the turbine chamber being disposed along the engine axis, and
    wherein the internal fixed blade platform and the external fixed blade platform each are curved in the direction of the combustion chamber, effective to relocate a thermal load due to hot gas deflection to the input area.

2. The combustion chamber arrangement of claim 1, wherein the internal wall portion is flat.

3. The combustion chamber arrangement of claim 2, wherein the external wall portion runs in a straight line and does not provide a contact surface for deflection of a hot gas flow through the transition section.

4. The combustion chamber arrangement of claim 1, wherein the internal wall portion is flat and the external wall portion runs in a straight line and does not provide a contact surface for deflection of a hot gas flow through the transition section, effective to reduce thermal load related material stresses on the transition section.

5. The combustion chamber arrangement of claim 1, wherein at least one of the internal fixed blade platform and the external fixed blade platform is extended in the direction of the transition section, effective to further move deflection of the hot gas flow in the direction of the turbine chamber.

6. The combustion chamber arrangement of claim 1, wherein the transition section and the input area are embodied so that a hot gas flow running from the combustion chamber into the turbine chamber is deflected in the direction of the engine axis substantially in the input area of the turbine chamber.

7. A gas turbine comprising the combustion chamber arrangement of claim 1.

8. A gas turbine comprising a plurality of combustion chamber arrangements of claim 1, wherein the transition sections of all the individual combustion chambers and all corresponding input areas of the turbine chambers are embodied so that deflection of a hot gas flow from each individual combustion chamber to the respective turbine chamber in the direction of the engine axis takes place essentially in the input area of the respective turbine chamber.

9. A combustion chamber arrangement in a gas turbine comprising:
    a combustion chamber comprising an upstream cylindrical input section and a downstream transition section, the transition section changing from a circular cross-section of the input section to a cross-section with an annular segment form at its downstream end and comprising an internal wall portion and an external wall portion; and
    a turbine chamber comprising an input area comprising an internal fixed blade platform and an external fixed blade platform;
    wherein the combustion chamber is disposed along a combustion chamber axis different from an engine axis, the turbine chamber being disposed along the engine axis, and
    wherein at least one of the internal fixed blade platform and the external fixed blade platform is extended toward the combustion chamber, effective to relieve the combustion chamber in a critical area of hot gas deflection.

10. The combustion chamber arrangement of claim 9, wherein the internal wall portion is flat.

11. The combustion chamber arrangement of claim 10, wherein the external wall portion runs in a straight line and does not provide a contact surface for deflection of a hot gas flow through the transition section.

12. The combustion chamber arrangement of claim 9, wherein the internal wall portion is flat and the external wall portion runs in a straight line and does not provide a contact surface for deflection of a hot gas flow through the transition section, effective to further reduce thermal load related material stresses on the transition section.

13. The combustion chamber arrangement of claim 9, wherein the transition section and the input area are embodied so that a hot gas flow running from the combustion chamber into the turbine chamber is deflected in the direction of the engine axis substantially in the input area of the turbine chamber.

14. A gas turbine comprising the combustion chamber arrangement of claim 9.

15. A gas turbine comprising a plurality of combustion chamber arrangements of claim 9, wherein the transition sections of all the individual combustion chambers and all corresponding input areas of the turbine chambers are embodied so that deflection of a hot gas flow from each individual combustion chamber to the respective turbine chamber in the direction of the engine axis takes place essentially in the input area of the respective turbine chamber.

* * * * *